United States Patent [19]
Preisser

[11] Patent Number: 6,000,645
[45] Date of Patent: Dec. 14, 1999

[54] AXIAL FLOW, BI-ROTOR CONCRETE RECLAIMER

[75] Inventor: Mark A. Preisser, Kiel, Wis.

[73] Assignee: BFK Technologies, Inc., Kiel, Wis.

[21] Appl. No.: 09/238,056

[22] Filed: Jan. 27, 1999

[51] Int. Cl.$^6$ ................................. B02C 17/02
[52] U.S. Cl. ................... 241/41; 241/42; 241/74; 241/79.3
[58] Field of Search ................... 241/41, 42, 74, 241/79.2, 79.3, DIG. 10

[56] References Cited

U.S. PATENT DOCUMENTS

| | | |
|---|---|---|
| 1,458,387 | 6/1923 | Bourne . |
| 1,461,067 | 7/1923 | Moser . |
| 4,062,497 | 12/1977 | Kemp, Jr. et al. . |
| 4,382,559 | 5/1983 | Hellberg ................ 241/79.3 |
| 4,418,871 | 12/1983 | Powell . |
| 4,538,767 | 9/1985 | Pimley ................ 241/79.3 |
| 4,616,786 | 10/1986 | Riker . |
| 4,632,320 | 12/1986 | Holz et al. ................ 241/46.17 |
| 5,108,584 | 4/1992 | Brosseuk . |
| 5,234,172 | 8/1993 | Chupka et al. . |
| 5,312,051 | 5/1994 | Preisser . |
| 5,441,475 | 8/1995 | Storruste et al. . |
| 5,540,395 | 7/1996 | Branscome . |
| 5,613,902 | 3/1997 | Didion et al. . |
| 5,624,077 | 4/1997 | Branscome . |
| 5,685,978 | 11/1997 | Petrick et al. . |
| 5,906,321 | 5/1999 | Martin ................ 241/41 |

*Primary Examiner*—John M. Husar
*Attorney, Agent, or Firm*—Richard C. Litman

[57] ABSTRACT

A concrete reclaimer having a pair of concentric mesh cylinders for separating wet concrete into its original components. The invention includes a hopper and feed screw for feeding wet concrete into the inner cylinder at a constant rate. The concrete is washed by a water spray as it passes through the cylinders. The inner cylinder is made from coarse mesh which allows sand and cement, but not gravel, to pass through. Gravel is deposited from the outlet end of the inner cylinder. The outer cylinder is made from fine mesh, allowing cement, but not sand, to pass through. Sand is deposited into the bottom of at least one dewatering screw, which allows water to drain as it elevates the sand. The dewatering screw is in thermal contact with a heated liquid tank to prevent the water from freezing. The cement is dropped through the outer cylinder into a series of settling ponds, where it is allowed to settle out of the water.

10 Claims, 4 Drawing Sheets

AXIAL FLOW, BI-ROTOR CONCRETE RECLAIMER

BACKGROUND OF THE INVENTION

1. Field of the Invention

The present invention relates to an apparatus for reclaiming wet concrete. Specifically, the invention includes a feed hopper with a screw conveyor, inner and outer concentric mesh cylinders for separating the concrete into its components, washing means, and a means for separating the individual components from the water.

2. Description of the Related Art

Methods of separating concrete into its individual components have been proposed, which components can then be stored and re-mixed at a later date. However, as compared to the other developments, the current invention has the advantages of providing controlled feeding of concrete into the separation apparatus, simultaneous washing and separation of the concrete, and improved means for removing water from the sand.

U.S. Pat. No. 1,458,387, issued to Charles L. Bourne on Jun. 12, 1923, describes a process for treating concrete aggregate. The aggregate is placed in a drum rotating at a high speed, so that the individual particles are thrown against the sides at high speed. The less desirable softer particles will be broken up into small pieces, while the more desirable hard particles will remain intact. The large and small particles can then be separated. This patent does not disclose a pair of concentric mesh cylinders for separating concrete.

U.S. Pat. No. 1,461,067, issued to Robert W. Moser on Jul. 10, 1923, describes an apparatus for treating sand and gravel. The sand and gravel are dumped onto a shaker screen from an elevated position, separating the larger gravel from the smaller sand. The sand passes through additional screens, separating the sand into different sized particles. The gravel is discharged into an agitator where it is washed. This patent does not disclose an apparatus capable of washing and separating the concrete at the same time.

U.S. Pat. No. 4,062,497, issued to Dennis E. Kemp Jr. on Dec. 13, 1977, describes a mill system having a proportioning feeder. A ball or rod mill sends particles to an air classifier, which sends oversized particles back to the mill along with the raw materials. The raw materials are fed into the space at the upper portion of the volumetric feeder above the oversized particles, so that the amount of raw materials sent to the mill is dependant on the amount of oversized particles already in the volumetric feeder. This patent does not disclose a pair of concentric mesh cylinders for separating concrete into its individual components.

U.S. Pat. No. 4,418,871, issued to Stuart A. Powell on Dec. 6, 1983, describes an apparatus for reducing mineral crystalline material. The minerals are first directed through a milling device wherein a turbine sets up a shock wave to break up the particles. The particles then go to a classifier having a series of vertical baffles, where they go through a series of vertical motion reverses, eventually falling into a hopper containing like-sized particles.

U.S. Pat. No. 4,616,786, issued to Rudolf Riker on Oct. 14, 1986, describes a plant for processing surplus concrete. Concrete is deposited from trucks into a receiving bin having a screw conveyor along the bottom. The screw conveyor drives the concrete to a cylindrical washer. The screw conveyor's speed is decreased as electrical consumption of the washer increases, maintaining a relatively constant throughput for the washer. This patent does not disclose concentric mesh cylinders for separating the concrete.

U.S. Pat. No. 5,108,584, issued to Raymond Brosseuk on Apr. 28, 1992, describes an apparatus for extracting heavy metals from ore. The apparatus has two concentric drums oriented at an angle of 2° to 15° from horizontal. The outer drum has an inner spiral vane. The inner drum has an upper fragmentation section with inwardly directed, longitudinally oriented impact vanes, a center trommel section having fine perforations at its upper end and coarse perforations at its lower end, and a lower discharge section. A sluice box is positioned to receive discharges from the upper end of the outer drum. The sluce box has a plurality of offset landings, with the upper landings intended to collect the coarser particles. The ore is separated into large tailings which are discharged from the lower end of the inner drum, and heavy, fine particles which are discharged from the top of the inner drum into the top of the sluce box.

U.S. Pat. No. 5,234,172, issued to David E. Chupka on Aug. 10, 1993, describes a method of cutting paper using a high pressure water stream.

U.S. Pat. No. 5,312,051, issued to Mark A. Preisser (the present inventor) on May 17, 1994, describes a fresh wet concrete reclaimer. The concrete reclaimer has a rotating cylindrical screen angled between 1° and 10° from horizontal, and a spray bar. The screen rotates rapidly enough so that the concrete is carried up to a point 90° from the bottom. Sprayed water is directed towards the middle of the mass of concrete. The upper end of the screen is made from fine mesh which allows cement slurry to pass through it. The lower mesh is made from coarser mesh, allowing sand to pass through it. Gravel exits the opposite end of the screen. This patent does not disclose the use of concentric mesh cylinders to separate the concrete.

U.S. Pat. No. 5,441,415, issued to Steinar Storruste and Mark A. Preisser (the present inventor) on Aug. 15, 1995, describes a centrifugal separator having a pair of mating horizontal frustroconical bowls, having concentric inlet and outlet pipes and wherein the top bowl is held against the bottom bowl by a spring. A baffle fits inside the bowls. A slurry enters through the inlet pipe, and the spinning of the bowls causes the more dense particles to move towards the outside. Sufficient rotational force causes the bowls to separate, allowing the heaviest particles to exit. Liquid exits through the central outlet pipe. This patent fails to disclose a pair of concentric mesh cylinders for separating the concrete.

U.S. Pat. No. 5,540,395, issued to Henry S. Branscome on Jul. 30, 1996, describes a concrete reclaimer comprising a rotating cylinder having a closed chamber and a screen chamber. Concrete is introduced to the closed chamber along with water, producing a slurry. The slurry is floated out of the closed chamber. The remaining sand and gravel is transferred to the screen chamber by four blades. The sand goes through the screen, and the gravel goes out the end of the reclaimer. This patent fails to disclose a pair of concentric mesh cylinders for separating the concrete.

U.S. Pat. No. 5,613,902, issued to Michael S. Didion et al. on Mar. 25, 1997, describes a sand reclaimer. The sand reclaimer has concentric inner and outer cylinders. The inner cylinder is perforated to allow sand to pass through to the outer cylinder. A helical vane on the inside of the inner cylinder pushes sand towards the outlet, and a second helical vane on the outside of the inner cylinder pushes sand towards the inlet. Large perforations at the end of the inner cylinder allow large particles of sand to pass through, and castings come out the outlet. At the inlet, a dust cover allows small particles of sand to exit the reclaimer for collection, while larger particles are directed back to the inner cylinder at the inlet for further tumbling. This patent does not disclose a means for simultaneously washing and separating concrete aggregate, or for removing water from the components after separation.

U.S. Pat. No. 5,624,077, issued to henry S. Branscome on Apr. 29, 1997, describes a concrete reclaimer comprising a rotating cylinder having a closed chamber and a screen chamber. Concrete is introduced to the closed chamber along with water, producing a slurry. The slurry is floated out of the closed chamber. The remaining sand and gravel is transferred to the screen chamber by eight blades. The sand goes through the screen, and the gravel goes out the end of the reclaimer. This patent does not disclose a pair of concentric mesh cylinders for separating concrete slurry.

U.S. Pat. No. 5,685,978, issued to Harold W. Petrick et al. on Nov. 11, 1997, describes a concrete reclaimer having a tank with two sections, and a pivoting screen between the two sections. Small particles filter through the screen into the first section, and large particles are dumped into the second section by pivoting the screen. This patent does not disclose a pair of concentric mesh cylinders for separating concrete slurry.

None of the above inventions and patents, taken either singularly or in combination, is seen to describe the instant invention as claimed. Thus a axial flow, bi-rotor concrete reclaimer solving the aforementioned problems is desired.

SUMMARY OF THE INVENTION

The invention is a concrete reclaimer for separating waste or unused concrete into its individual components, which can then be stored and re-used in the future. Concrete is typically mixed in large batches before loading onto trucks, so these trucks will commonly return to the plant with a partial load of unused concrete. The Environmental Protection Agency has mandated that such unused concrete be recycled and/or disposed of in accordance to the Storm Water Runoff Act of 1992.

The invention includes a hopper with a feed screw, a pair of concentric mesh cylinders, water sprayers for washing the concrete during separation, a conveyor for separated gravel, at least one dewatering screw for transporting and removing water from separated sand, and at least one settling pond for removing cement from the water. The invention is powered by an electric motor powering a hydraulic pump, with the hydraulic pump pumping oil through a hydraulic motor directly coupled to a central drive shaft at the outlet end of the concentric cylinders. The drive shaft is connected to the cylinders by perpendicular braces. The electric motor therefore powers the cylinder rotation by driving the hydraulic pump, which drives the hydraulic motor, which in turn drives the drive shaft.

When a cement truck returns with a partial load of unused concrete, the truck discharges the concrete into the hopper. The hopper has a feed screw at the bottom, which feeds concrete into the inner mesh cylinder. The hopper and feed screw arrangement ensures that concrete is fed into the inner cylinder at a constant rate. The concentric cylinders are angled slightly downward, so that gravity causes the concrete aggregate to pass from the intake end to the outlet end. While in the cylinders, the concrete aggregate is washed using water pipes having apertures for spraying water through the cylinders. The angle of the cylinders combined with their rotation causes the concrete aggregate to travel from the inlet end towards the outlet end. The cylinder rotation also agitates the concrete aggregate, raising it up, and then causing it to fall when the aggregate reaches a height where the cylinder rotation can no longer carry it higher. Washing the concrete reduces the tendency of the concrete aggregates to clump together, resulting in more effective separation. The inner cylinder is made from coarse mesh, which allows sand and cement to pass through it into the outer cylinder, while preventing gravel from passing through. Gravel travels through the inner cylinder, and is deposited from the inner cylinder's outlet end onto a conveyor leading to a gravel pile for storage.

Sand and cement pass through the inner cylinder into the outer cylinder. The outer cylinder is made from fine mesh, which allows passage of cement and water, but not sand. Cement and water fall through the outer cylinder and into a series of settling ponds. Each successive settling pond allows additional cement to settle out of the water, until the water becomes clean at the final settling pond.

Sand is deposited from the outer cylinder's outlet end into the bottom of the dewatering screws. Each dewatering screw is contained inside a tray angled upward. As sand is pushed upward by the dewatering screw, water runs downward, away from the sand. Dry sand is deposited from the top of the dewatering screw into a sand storage area. Preferably, the trays for the dewatering screws sit on top of a tank containing a heated liquid, which is preferably a mixture of water and antifreeze, but which may also be oil. The heated liquid never comes in actual contact with the sand and water in the dewatering screws, but is always in thermal contact, which prevents the water in the sand from freezing in cold weather.

Accordingly, it is a principal object of the invention to provide a means of efficiently separating concrete aggregate into its individual components for recycling.

It is another object of the invention to provide a means of feeding concrete aggregate into the reclaimer at a constant rate.

It is a further object of the invention to provide a system for removing water from the separated sand even at temperatures below freezing.

Still another object of the invention is to wash and separate all of the individual components of the concrete aggregate at the same time.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a concrete reclaimer having inner and outer concentric mesh cylinders for separating the concrete into its individual components for later re-use. The reclaimer includes a hopper with a feed screw for feeding concrete aggregate into the reclaimer at a constant rate, a water spraying system for washing the concrete as it is separated, heated dewatering screws for removing water from the separated sand, and settling ponds for removing cement from the water.

Figure 2:
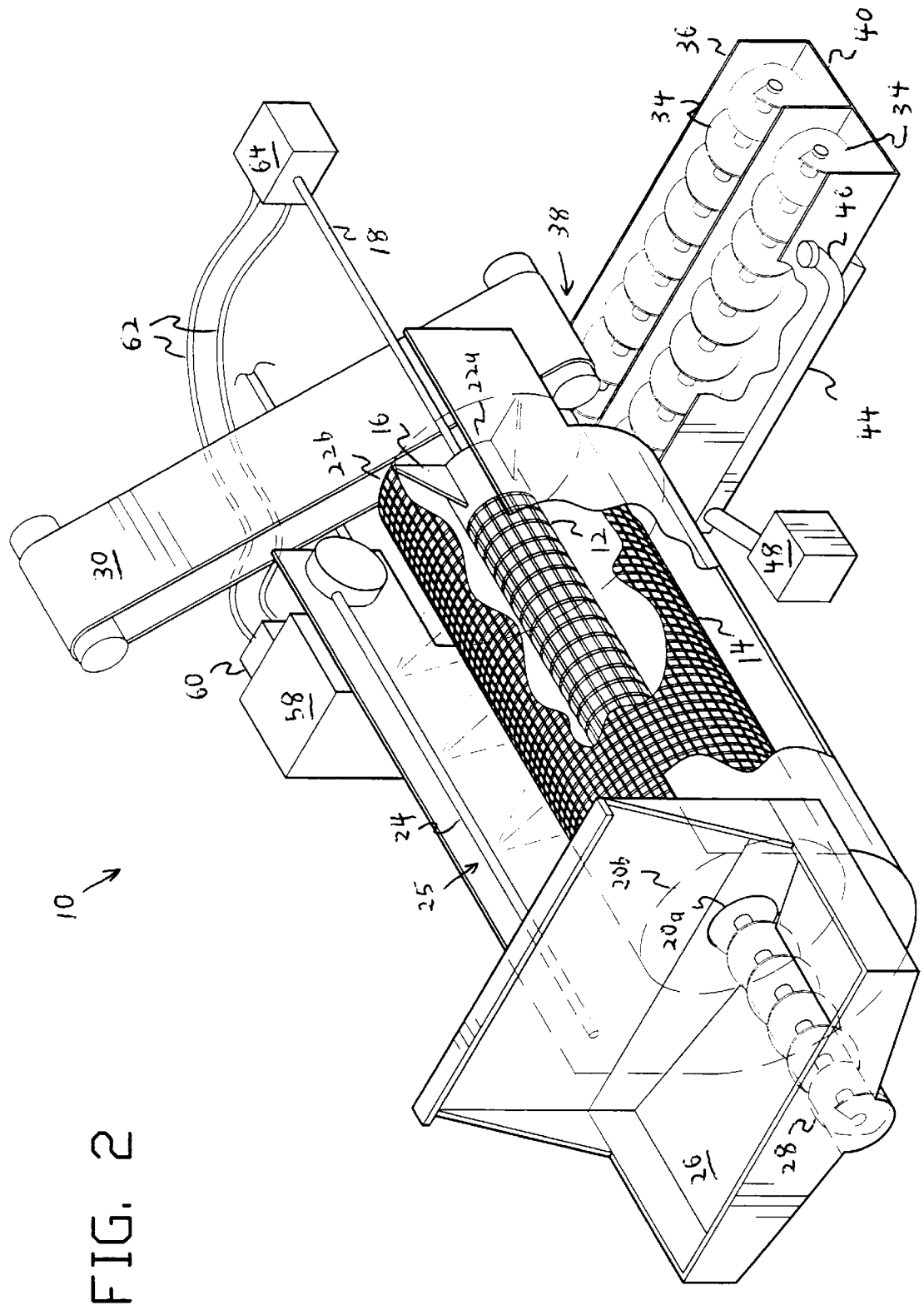
FIG. 2 is a perspective view of an axial flow, bi-rotor concrete reclaimer according to the present invention.

Referring to FIG. 2, concrete reclaimer 10 comprises inner coarse mesh cylinder 12, and outer fine mesh cylinder 14. The inner cylinder 12 and outer cylinder 14 are parallel and concentric, connected by braces 16. Drive shaft 18 is attached to braces 16, and is concentric and parallel to inner cylinder 12. Inner cylinder 12 has intake end 20a and outlet end 22a, corresponding to the intake end 20b and outlet end 22b of outer cylinder 14. Inlet ends 20a,20b are elevated higher than outlet ends 22a,22b, thereby allowing concrete aggregate to flow through the cylinders due to the force of gravity. Water spray pipe 24 runs above outer cylinder 14 along its length. Water spray pipe 24 has a substantial number of small apertures 25 for directing pressurized water through outer cylinder 14 and inner cylinder 12.

Inlet ends 20a,20b of inner cylinder 12 and outer cylinder 14 are adjacent to hopper 26. Hopper 26 has feed screw 28 at its bottom. Feed screw 28 is concentric with inner cylinder 12, and is connected at its end to drive shaft 18.

Figure 4:
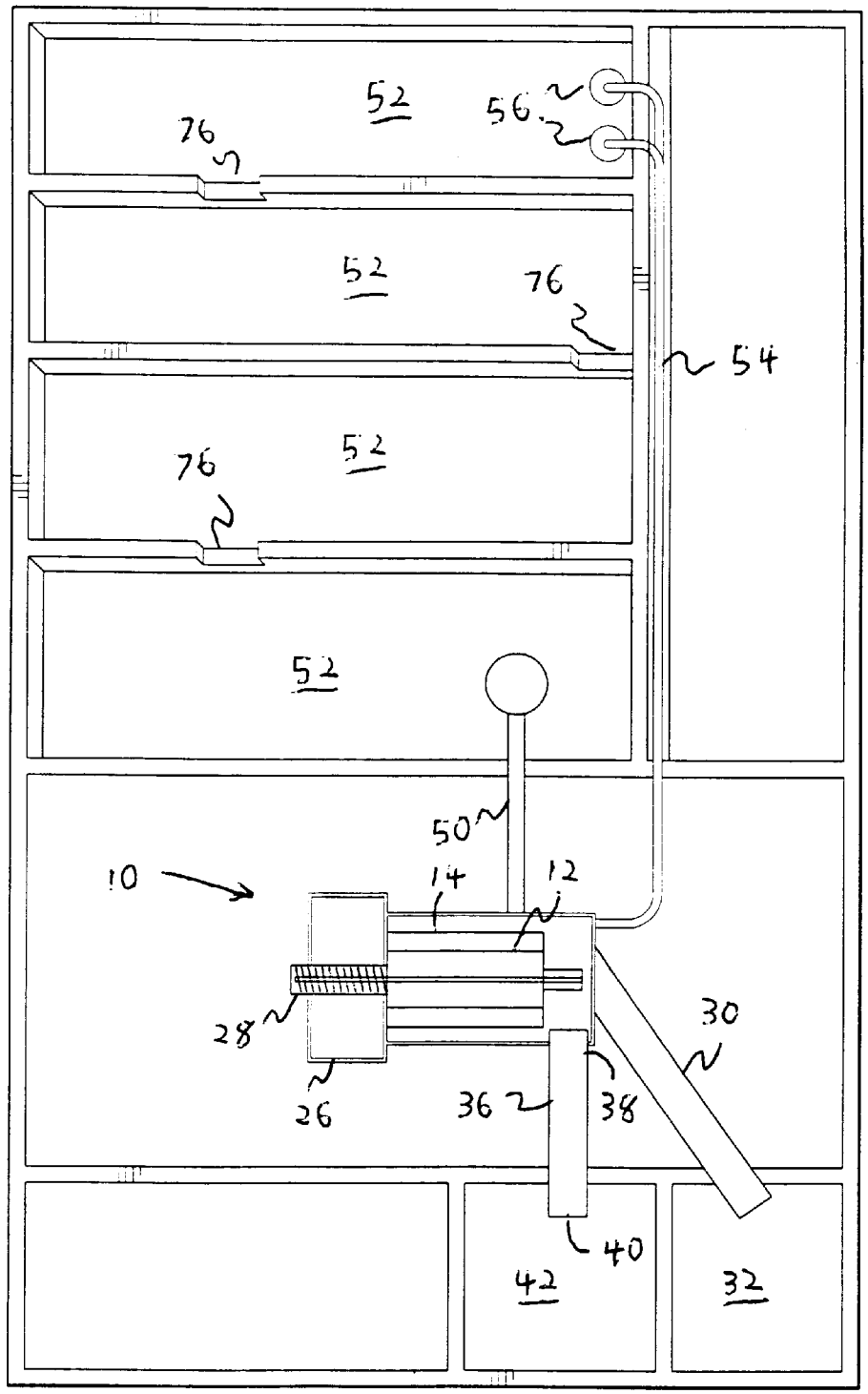
FIG. 4 is a top plan view of a system for reclaiming concrete using the axial flow, bi-rotor concrete reclaimer according to the present invention.

Outlet end 22b is adjacent to the lower end of conveyor belt 30, which extends from outlet end 22b to a position above gravel storage area 32. Outlet end 22a is adjacent to the lower end of dewatering screws 34. Dewatering screws 34 are contained within trays 36. Trays 36 have a lower end 38 to allow water to drain from the tray, and an upper end 40 for dumping sand into sand storage area 42 (FIG. 4). Liquid heating tank 44 is directly beneath trays 36. Tank 44 contains water and/or antifreeze, or oil. The liquid in tank 44 is isolated from tray 36, but tank 44 is in thermal contact with tray 36. Tank 44 is filled using valve 46, and the liquid is heated by heater 48.

Figure 1:
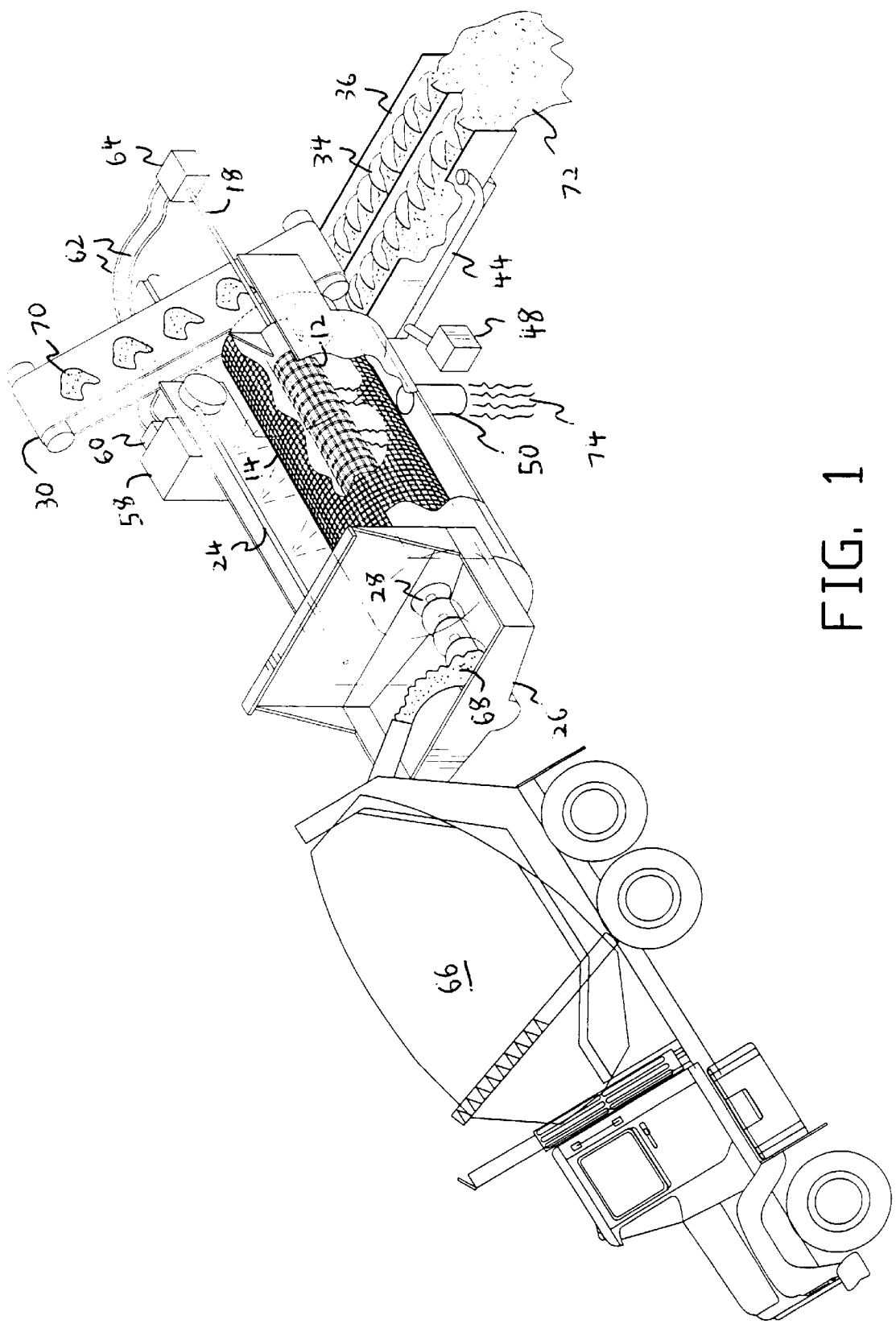
FIG. 1 is an environmental, perspective view of an axial flow, bi-rotor concrete reclaimer according to the present invention.

Below outer cylinder 14 is chute 50 as best shown in FIG. 1. Referring to FIG. 4, chute 50 leads to a series of settling pond 52. The settling ponds 52 are connected by weirs 76, allowing water to flow from near the top of one settling pond 52 to the next settling pond 52. Pipe 54 runs from the last settling pond 52 to one end of water spray pipe 24 through pump 56.

Referring back to FIG. 2, power is supplied to the concrete reclaimer by electric motor 58. Electric motor 58 operates hydraulic pump 60, which pumps oil through hoses 62 to hydraulic motor 64. Hydraulic motor 64 is connected to drive shaft 18. Drive shaft 18, connected to braces 16, and running through inner cylinder 12 to feed screw 28, can thereby rotate inner cylinder 12, outer cylinder 14, and feed screw 28. In a similar manner, hydraulic pump 60 also powers a second hydraulic motor for operating the dewatering screws 34, and a third hydraulic motor for operating the conveyor belt 30. The second and third hydraulic motors, powering the dewatering screws 34 and conveyor belt 30, are not shown in the figures for simplicity, as the use of a hydraulic motor to power a rotating mechanical implement is well known.

Figure 3:
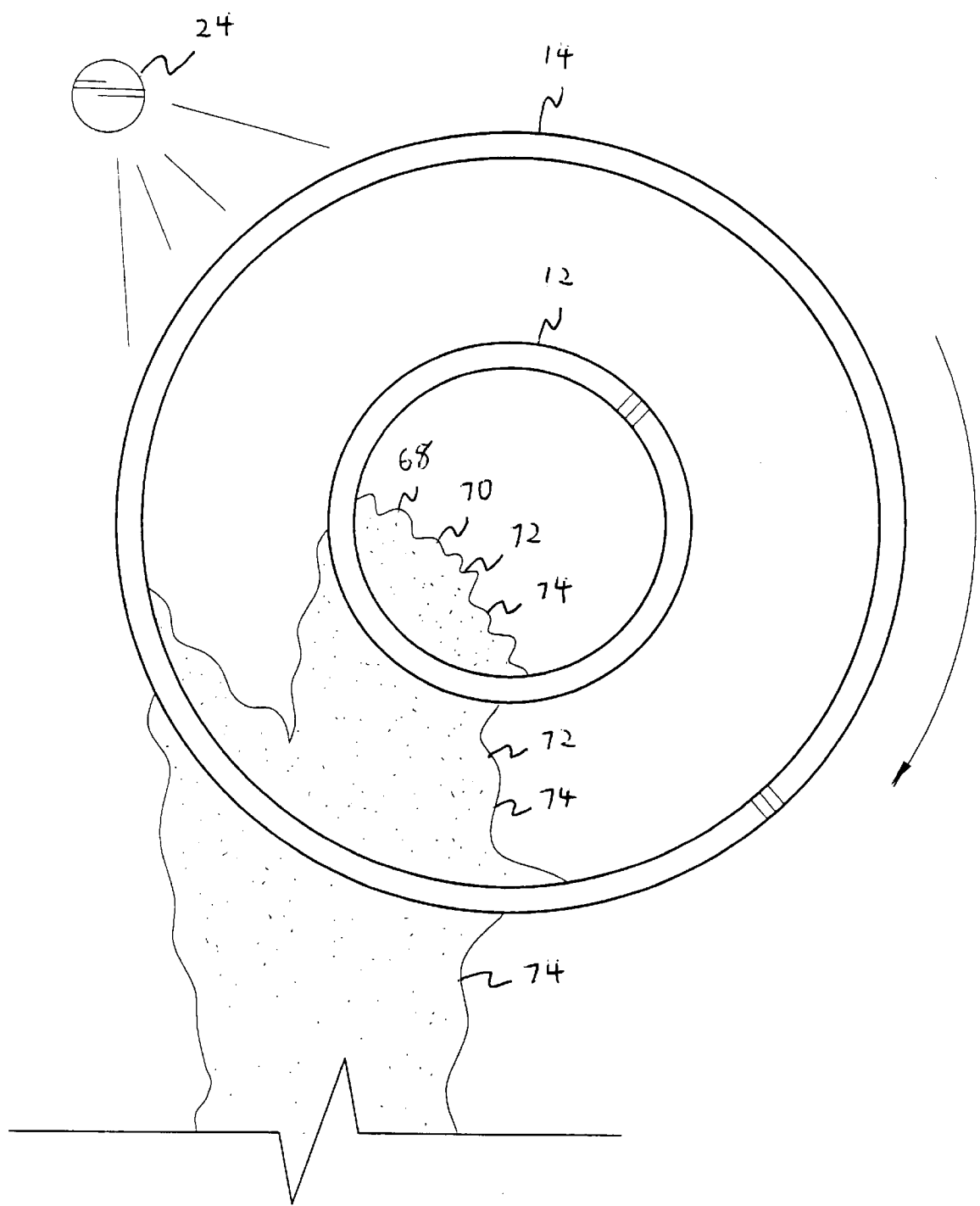
FIG. 3 is a diagrammatic end view of the concentric mesh cylinders of the axial flow, bi-rotor concrete reclaimer according to the present invention.

The process of reclaiming unused wet cement is illustrated in FIGS. 1 and 3. Cement truck 66 deposits wet concrete aggregate 68 into hopper 26. Feed screw 28 feeds concrete aggregate 68 into inner cylinder 12 at inlet 20a. Inner cylinder 12 and outer cylinder 14 rotate, causing concrete aggregate 68 to rise a certain distance, and then fall when it reaches a height where the rotation of the cylinders can no longer lift it higher. The rotation of the cylinders, combined with their downward angle, causes the aggregate to be pulled by gravity from the inlet end 20a to the outlet ends 22a,22b. Water is sprayed over the concrete aggregate from water spray pipe 24, preventing the concrete aggregate 68 from clumping. The concrete aggregate 68 comprises gravel 70, sand 72, and cement 74. The mesh of inner cylinder 12 allows sand 72 and cement 74 to pass through to the outer cylinder 14, but does not allow gravel 70 to pass through. Gravel 70 therefore travels to outlet end 22a, where the gravel 70 is deposited on conveyor belt 30, which transports it to gravel storage area 32.

Outer cylinder 14 allows cement 74 to pass through, but does not allow sand 72 to pass through. Sand 72 is therefore deposited from outlet 22b into the lower end of trays 36, containing dewatering screws 34. Dewatering screws 34 push sand 72 towards the upper end 40 of trays 36, while allowing water to drain out the lower end 38 of trays 36. Tank 44, containing liquid heated by heater 48, prevents the water from freezing if the outside temperature drops below 32° F.

Cement 74, along with wash water from pipe 24, passes through outer cylinder 14, through chute 50, into the first of settling ponds 52. Some of cement 74 settles out of the water in the first settling pond 52. As cement and water flows into the first settling pond 52, water is displaced from that settling pond 52 to the next settling pond 52 over weirs 76, where additional cement settles out. By the time the water flows into the last settling pond 52, most or all of the cement has settled out of the water, leaving only clean water. This clean water is pumped by pump 56 through pipe 54 into water spray pipe 24, to continue washing the concrete aggregate 68.

Once the gravel 70, sand 72, and cement 74 has been separated from each other and from the water, and placed into storage, they can be re-used at a later time.

It is to be understood that the present invention is not limited to the embodiment described above, but encompasses any and all embodiments within the scope of the following claims.

I claim:

1. A concrete reclaimer, comprising:

an inner elongated cylinder having coarse mesh walls, said inner cylinder having an intake end and an outlet end, said intake end being higher than said outlet end;

an outer elongated cylinder parallel to and concentric with said inner cylinder, said outer cylinder having fine mesh walls, said outer cylinder having an intake end and an outlet end corresponding to said intake end and outlet end of said inner cylinder;

a hopper adjacent said intake end of said inner and outer cylinders;

at least one dewatering screw adjacent said outlet end of said outer cylinder;

an inclined conveyor having a lower end adjacent said outlet end of said outer cylinder;

power means for rotating said inner and outer cylinders and operating said at least one dewatering screw and said conveyor; and means for spraying water through said inner and outer cylinders.

2. The concrete reclaimer according to claim 1, wherein said hopper includes a feed screw.

3. The concrete reclaimer according to claim 1, further comprising a heated tank in thermal contact with said at least one dewatering screw, said tank containing a liquid.

4. The concrete reclaimer according to claim 3, wherein said liquid is chosen from the group consisting of water, antifreeze, a mixture of water and antifreeze, and oil.

5. The concrete reclaimer according to claim 1, further comprising at least one settling pond, positioned to receive cement passing through said outer cylinder.

6. The concrete reclaimer according to claim 1, wherein said means for spraying water is a pipe parallel to said cylinders, said pipe having apertures dimensioned and configured for spraying water through said inner and outer cylinders.

7. The concrete reclaimer according to claim 1, wherein said power means is a motor.

8. The concrete reclaimer according to claim 7, further comprising a central drive shaft having a first end connected to said motor, and a second end connected to said inner and outer cylinder.

9. The concrete reclaimer according to claim 7, wherein said motor is electric.

10. The concrete reclaimer according to claim 7, wherein said motor is hydraulic.

* * * * *